US008805774B2

(12) United States Patent
Boyer et al.

(10) Patent No.: US 8,805,774 B2
(45) Date of Patent: Aug. 12, 2014

(54) METHOD AND SYSTEM FOR ROLE BASED SITUATION AWARE SOFTWARE

(75) Inventors: John E. Boyer, Seattle, WA (US); Edward E. Kelley, Wappingers Falls, NY (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/033,112

(22) Filed: Feb. 19, 2008

(65) Prior Publication Data
US 2009/0210408 A1 Aug. 20, 2009

(51) Int. Cl.
G06F 7/00 (2006.01)

(52) U.S. Cl.
USPC ............................................. 707/608

(58) Field of Classification Search
USPC ................ 707/608, 809, 827, 999.201
See application file for complete search history.

(56) References Cited

U.S. PATENT DOCUMENTS

| | | | |
|---|---|---|---|
| 6,085,186 A | 7/2000 | Christianson et al. | |
| 6,327,590 B1 | 12/2001 | Chidlovskii et al. | |
| 6,424,979 B1 * | 7/2002 | Livingston et al. | 715/206 |
| 6,507,845 B1 * | 1/2003 | Cohen et al. | 707/608 |
| 6,564,222 B1 | 5/2003 | Sassano | |
| 6,598,046 B1 * | 7/2003 | Goldberg et al. | 1/1 |
| 6,678,698 B2 * | 1/2004 | Fredell et al. | 707/608 |
| 6,826,716 B2 * | 11/2004 | Mason | 714/38 |
| 7,213,030 B1 | 5/2007 | Jenkins | |
| 7,240,055 B2 | 7/2007 | Grasso et al. | |
| 7,275,068 B2 | 9/2007 | Huberman et al. | |
| 7,340,442 B2 | 3/2008 | Jeanblanc et al. | |
| 7,340,459 B2 | 3/2008 | Krohn et al. | |
| 7,499,965 B1 | 3/2009 | Chai | |
| 7,591,000 B2 * | 9/2009 | Griffin et al. | 726/1 |
| 7,716,365 B2 * | 5/2010 | Cahill et al. | 709/238 |
| 7,738,900 B1 | 6/2010 | Manroa et al. | |
| 7,822,762 B2 | 10/2010 | Payne et al. | |
| 7,991,840 B2 | 8/2011 | Boyer et al. | |
| 8,260,859 B2 | 9/2012 | Boyer et al. | |
| 8,386,483 B2 | 2/2013 | Boyer et al. | |
| 2002/0049692 A1 | 4/2002 | Venkatram | |
| 2002/0049750 A1 * | 4/2002 | Venkatram | 707/3 |
| 2003/0154232 A1 * | 8/2003 | Beringer et al. | 709/102 |
| 2004/0044658 A1 | 3/2004 | Crabtree et al. | |
| 2005/0132224 A1 * | 6/2005 | Estrada et al. | 713/201 |

(Continued)

OTHER PUBLICATIONS

Search Strategies for Scientific Collaboration networks; Paul-Alexandru Chrita, Andrei Damian, Wolfgang Nejdl, Wolf Siberski; L3S Research Center/ University of Hannover, Germany, Nov. 4, 2005.*

(Continued)

*Primary Examiner* — Mohammed R Uddin
(74) *Attorney, Agent, or Firm* — Cantor Colburn LLP (57) ABSTRACT

A method for role based situation aware software includes: mapping one or more users to one or more communities of practice (CoP); aggregating a series of tags from the one or more CoP to form an initial set of role-based tags; filtering the initial set of role-based tags based on user context elements to form context sensitive user-role tags; querying one or more information services based on the context sensitive user-role tags; aggregating information obtained from querying the one or more information services; and providing the aggregated information to the user as dynamic context related content.

17 Claims, 7 Drawing Sheets

(56) References Cited

U.S. PATENT DOCUMENTS

| | | | |
|---|---|---|---|
| 2006/0041582 | A1 | 2/2006 | Hekmatpour |
| 2006/0053195 | A1 | 3/2006 | Schneider et al. |
| 2006/0200434 | A1 | 9/2006 | Flinn et al. |
| 2006/0288095 | A1 | 12/2006 | Torok et al. |
| 2007/0016464 | A1* | 1/2007 | Yen et al. ............... 705/9 |
| 2007/0016575 | A1 | 1/2007 | Hurst-Hiller et al. |
| 2007/0112913 | A1 | 5/2007 | Bales |
| 2007/0198506 | A1 | 8/2007 | Attaran Rezaei et al. |
| 2007/0255721 | A1 | 11/2007 | Chess et al. |
| 2007/0255781 | A1 | 11/2007 | Li et al. |
| 2008/0040674 | A1 | 2/2008 | Gupta |
| 2008/0052246 | A1 | 2/2008 | Dunagan et al. |
| 2008/0147790 | A1 | 6/2008 | Malaney et al. |
| 2008/0184336 | A1 | 7/2008 | Sarukkai et al. |
| 2008/0243827 | A1 | 10/2008 | Sarma et al. |
| 2008/0282198 | A1 | 11/2008 | Brooks et al. |
| 2009/0024585 | A1 | 1/2009 | Back et al. |
| 2009/0070128 | A1* | 3/2009 | McCauley et al. ............... 705/1 |
| 2009/0070426 | A1* | 3/2009 | McCauley et al. ............ 709/205 |
| 2009/0077094 | A1 | 3/2009 | Bodain |
| 2009/0083220 | A1* | 3/2009 | Petri ............................... 707/3 |
| 2009/0193096 | A1 | 7/2009 | Boyer et al. |
| 2009/0210408 | A1 | 8/2009 | Boyer et al. |
| 2009/0235167 | A1 | 9/2009 | Boyer et al. |
| 2009/0254422 | A1* | 10/2009 | Jenkins et al. ............... 705/11 |
| 2009/0254572 | A1* | 10/2009 | Redlich et al. ............... 707/10 |
| 2010/0050090 | A1* | 2/2010 | Leebow ..................... 715/751 |
| 2011/0099168 | A1 | 4/2011 | Boyer et al. |
| 2011/0213840 | A1 | 9/2011 | Boyer et al. |

OTHER PUBLICATIONS

Diederich, et al.; "Finding Communities of Practice form User Based on Folksonomies"; Innovative Approaches for Learning and Knowledge Sharing, EC-TEL 2006 Workshops Proceedings; p. 288-297; 2006.

Final Office Action for U.S. Appl. No. 12/046,914.

Glance, et al.; "Knowledge Pump: Community-centered Collaborative Filtering"; Proceedings of the Delos Workshop on Collaborative Filtering; p. 1-5; 1997.

Non-final Office Action dated Jan. 18, 2012 for U.S. Appl. No. 12/604,204.

Non-final Office Action for U.S. Appl. No. 12/046,914.

Pawar, et al.; "Towards Business Models and Technical Platform for the Service Oriented Context-Aware Mobile Virtual Communities"; IEEE Symposium on Computers and Communications; p. 103-110; Jul. 2008.

Notice of Allowance dated Mar. 25, 2011 for U.S. Appl. No. 12/019,074 pp. 1-17.

Notice of Allowance dated Aug. 9, 2012 for U.S. Appl. No. 12/604,204 pp. 1-11.

International Search Report dated Sep. 7, 2014 for Application No. PCT/EP2009/052158.

Xu, Zhichen, et al.; "Towards the Semantic Web: Collaborative Tag Suggestions"; Proceedings of the 15th International World Wide Web Conference WWW2006 Proceedings of the Collaborative Web Tagging Workshop; pp. 1-8; 2006.

* cited by examiner

METHOD AND SYSTEM FOR ROLE BASED SITUATION AWARE SOFTWARE

BACKGROUND OF THE INVENTION

1. Field of the Invention

This invention relates generally to service oriented architectures, and more particularly to a system, article, and method that provide a situationally aware software information tool that maps user roles to a consistent set of tags.

2. Description of the Related Art

Service Oriented Architecture (SOA) is a development of distributed computing and modular programming in which existing or new technologies are grouped into autonomic systems. SOAs employ software services to build applications. Services are relatively large, intrinsically unassociated units of functionality with externalized service descriptions. SOAs typically implement functionalities most humans would recognize as a service, such as filling out an online application for an account, viewing an online bank statement, or placing an online booking or airline ticket order. Thus, SOA serves to align business and information technology (IT).

In an SOA environment, instead of services embedding calls to each other in their source code, protocols are defined that describe how one or more services may talk to each other. In an SOA environment, one or more services communicate with one another by passing data from one service to another, or coordinate an activity between one or more services. In addition, independent services may be accessed without the knowledge of the underlying platform implementation. In this manner, autonomic services may be orchestrated into higher-level services. In SOA, the application architecture has all its functions and services defined using a description language having invokable interfaces that are called to perform business processes. In SOA, each interaction is independent of each and every other interaction, and the interconnect protocols of the communicating devices (i.e., the infrastructure components that determine the communication system do not affect the interfaces). Because interfaces are platform-independent, a client from any device using any operating system in any language can use the service A current challenge in SOA development is to build business driven composite services atop of autonomic informational services. By defining a methodology for the use and re-use of software services and business processes, which typically encompass multiple service invocations, SOA has the potential to provide a great deal of flexibility and cost savings to enterprises that rely on information technology (IT).

The SOA concept is based upon an architectural style that defines an interaction model between three primary building blocks: a) a service provider, which publishes a service description and provides the implementation for the service; b) a service requester, which can either use the uniform resource identifier (URI) for the service description directly, or find the service description in a service registry and bind and invoke the service; and c) a service broker, which provides and maintains the service registry using, for example, the Universal Description Discovery and Integration (UDDI) specification, which defines a way to publish and discover information about web services.

A web service is a software application designed to support interoperable machine-to-machine interaction over a network, and is frequently simple web application program interfaces (API) that may be accessed over a network, such as the Internet, and executed on a remote system hosting the requested services. Web services may provide an example of an SOA implementation in which the basic unit of communication is a message, rather than an operation, by making functional building blocks accessible over standard Internet protocols that are independent from platforms and programming languages.

"Web 2.0" is a term that refers to an increasingly frequented type of web application that is primarily distinguished by the ability of visitors to continually contribute information for collaboration and sharing. Web 2.0 applications use web services, and may include composite user interfaces that provide combinations of various service technologies such as collaborative and social software, web syndication, weblogs, and wikis. While there are no set standards for Web 2.0, Web 2.0 is a user-driven architecture of participation that utilizes the SOA characteristics of building on the existing architecture and using services. The evolving technology infrastructure of Web 2.0 includes various applications that may provide users with information storage, creation, and dissemination capabilities that go beyond what had formerly been expected of web applications.

A number of Web 2.0 applications feature the extensive use of folksonomies. A folksonomy involves the practice of collaborative categorization using freely-chosen tags, that is, metadata in the form of descriptive keywords or terms associated with or assigned to a piece of information, and arises in web applications in which special provisions are made at the site level for creating and using tags for web content. Collaborative tagging in this fashion is intended to enable a body of information to be increasingly easy to search, discover, and navigate over time, and folksonomies are commonly used to label, classify, and retrieve web content such as web pages, digital images, Internet bookmarks, and web links. As folksonomies develop in web-mediated social environments, users often discover the tag sets of another user who tends to interpret and tag content in a way that makes sense to them. The use of folksonomies may result in an immediate and rewarding gain in user capacity to find related content.

Flickr and del.icio.us are examples of websites that use folksonomic tagging to organize content. Flickr is a digital image storage and management service that is configured with a user interface, to tag images with descriptive nouns, verbs, and adjectives, and systematically perform CRUD (create, read, update, and delete) operations on photography entries. del.icio.us is a social bookmarking site that is configured for users to create and store Internet bookmarks, and then tag the bookmarks with many descriptive words, facilitating others to search by those terms to find sites that have been found useful.

Within the realm of a business enterprise and its network of partners, there are numerous opportunities for collaboration. The use of Web 2.0 technologies and SOA principles has the potential to increase the reach and improve the richness of this interaction in enterprise informational services, leading to more efficient development of new business models and processes by using readily available, intuitive modular elements. By creating an environment in which employees can collaborate efficiently, by leveraging each other's intellect and resources, employees can create stronger and more successful products. Nevertheless, most software that is touted as enabling enterprise collaboration is difficult to use, cumbersome, and does not adequately empower employees to share their content. This results in SOA implementations that undesirably add more custom logic and increased complexity to an IT infrastructure. A big hurdle for the typical large enterprise is the ability to standardize knowledge practice across that enterprise, and to implement tools and processes that support that aim.

An example of an enterprise or business-driven collaborative enterprise environment is that of a composite service system. A composite service system comprises a collection of collaborative or interactive services, which aggregate domain-specific (or context-aware) content information that may be utilized by employees to maintain consistency across all of the enterprise informational services. Examples of systems that may be implemented in this fashion include project management systems, which are used to schedule, track, and chart the steps in a project as it is being completed, workflow systems, which enable the collaborative management of tasks and documents within a knowledge-based business process, and knowledge management systems, which are used to collect, organize, manage, and share various forms of information. Operations such as record management, content management, collaborative software, workflow or business process management, and other mechanisms designed to capture the efforts of many into a managed content environment are typical of these workplace collaboration technologies.

Domain knowledge is the body of knowledge about a particular activity environment. In an enterprise, domain knowledge has traditionally been organized (formally or informally) in an institutionally supported taxonomy that is domain-specific. Domain knowledge may be kept in data repositories such as Lotus Notes Teamrooms, ad-hoc websites, knowledgebases, social bookmarks, or applications, and so on. A workplace-generated folksonomy would be useful, for example, with business-driven collaborative or interactive management systems of composite services that are designed to help employees working on a common task achieve their goals.

However, the unsystematic methodology of folksonomic tagging may be unreliable and inconsistent for use in large enterprises. Typically, there is no information about the meaning or semantics of a tag and because of the lack of a hierarchical or systematic structure for the tagging system, the terms often fail to show their relationship to other objects of the same or similar type, or lead to irrelevant connections between objects. In a situation where a user is in a collaborative or social software environment has found a new, important piece of information, or has posted new content relevant to the community on an external collaborative software application, the user may only employ existing folksonomies, or create a tag on-the-fly, which may not be consistent with the domain-specific taxonomy. Thus, while this user will be aware of the new object, other users in the same environment will not encounter this new information when performing tag searches using, for example, a feed reader.

When a tagging system is defined informally, continually changing, and lacking governance, it may be burdensome to use the tags so constructed to automate workflow and business processes, and tags associated with resources could grow to unruly proportions. Keeping track of this information is challenging and, as the use of collaborative and social software increases both internally (that is, within a corporate firewall) and externally (or publicly), the issue of synchronizing tagged information between the public and private spaces becomes a greater concern, as the public social software applications are not aware of the private domain specific tags or taxonomies.

SUMMARY OF THE INVENTION

Embodiments of the present invention include a method, article, and system for role based situationally aware software, the method includes: mapping a user to one or more communities of practice (CoP); aggregating a series of tags from the one or more CoP to form an initial set of user role-based tags; filtering the initial set of user role-based tags based on user context elements to form context sensitive user-role tags; querying one or more information services based on the context sensitive user-role tags; aggregating information obtained from querying the one or more information services; and providing the aggregated information to the user as dynamic context related content.

An article comprising one or more computer-readable storage media containing instructions that when executed by a computer enables a role based situationally aware software application that maps user roles to a consistent set of tags, wherein the method further includes: mapping a user to one or more communities of practice (CoP); aggregating a series of tags from the one or more CoP to form an initial set of user role-based tags; filtering the initial set of user role-based tags based on user context elements to form context sensitive user-role tags; querying one or more information services based on the context sensitive user-role tags; aggregating information obtained from querying the one or more information services; and providing the aggregated information to the user as dynamic context related content.

A system for a situation based software information tool that maps user roles to a consistent set of tags, the system includes: one or more server devices in communication with one or more client devices through a network; the server devices and the client devices configured to execute electronic software; wherein the electronic software is resident on storage mediums in signal communication with the client and server devices; wherein the electronic software comprises a series of instructions configured for: mapping a user to one or more communities of practice (CoP); aggregating a series of tags from the one or more CoP to form an initial set of user role-based tags; filtering the initial set of user role-based tags based on user context elements to form context sensitive user-role tags; querying one or more information services based on the context sensitive user-role tags; aggregating information obtained from querying the one or more information services; and providing the aggregated information to the user as dynamic context related content.

TECHNICAL EFFECTS

As a result of the summarized invention, a solution is technically achieved for a method, article, and system for providing a situationally aware software information tool that maps user roles to a consistent set of tags.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Software professionals (architects, developers, etc.) utilize software development information furnished by an enterprise to carryout their assigned tasks. However, software development information in an enterprise is often static and thus, maybe outdated. Furthermore, it is generally distributed in different information repositories and is not situationally-based, and therefore does not take into account a software professional's particular circumstances. As a result, software professionals are challenged with assembling current software development information, and assessing the applicability of the assembled software development information against their specific situation.

A typical software development situation from the software professional's perspective has four primary elements: content, context, tooling and method. The main problem facing software professionals is that there is no comprehensive solution that dynamically aggregates information from disparate sources based on the situational factors. Software professionals require the ability to obtain and interpret information from numerous disparate information sources to make decisions throughout a software development lifecycle. Moreover, software professionals require context-specific information on tooling, best practices, assets, and patterns of asset usage based on situational factors such as their role, membership to communities of practice (CoPs), current place or position in a method, industry vertical context, current file type in use (e.g., UML model), and current tool in use.

For example, a large IT company has just hired an experienced senior software architect, who is assigned to work on a large-scale SOA implementation project. The senior software architect possesses a strong software engineering background, but is not familiar with the IT company's methods, tools and best practices. Moreover, the senior software architect has not yet established working relationships with others on the project. The information that is required by the senior software architect to be productive on the project is dispersed among numerous web applications, repositories, knowledge bases, forums, and ad-hoc web sites around the company. Moreover, the information is not situationally-based nor is it compiled in any single location; therefore, just knowing where to start is a huge challenge for the senior software architect.

Continuing with the example, the senior software architect reports to their position at the IT company, and learns that the architecture team will be unable to help them get up to speed for at least week or more. Furthermore, the senior software architect's immediate supervisor is out on vacation. In addition, other people are working in completely different domain areas, and are not able to provide assistance to the senior software architect.

However, the senior software architect has been asked to start work on a "Service Specification" task that is defined in the IT company's software development process. The IT company has an on-boarding document, which does contain some pointers to useful information, but the on-boarding document does not have the situationally-based context-specific information that the senior software architect requires to carry out the "Service Specification" tasks. Moreover, the on-boarding document is out-of-date, and does not have links to some critical websites and knowledge bases that the senior software architect will need, and in addition many of the key subject matter experts listed in the on-board document have left the company.

Therefore, as a consequence of the senior software architect's current circumstances, the senior software architect does not have access to the full complement of information that they require to perform their assigned task properly and efficiently. Moreover, the senior software architect is unable to elaborate on their situational factors such as tooling or methods, and as a result gaps exist in their context. Thus, any information the software architect does obtain will be incomplete or obsolete.

The present example situation encountered by the senior software architect is not uncommon, even when assistance is available, because software development information is typically static, may be out-of-date and is dispersed among disparate information sources. Moreover, the information is not situationally-based. Therefore, a software professional not only has to discover the appropriate information from multiple places, but is also required to make an assessment as to which portions of the information apply to their particular situation. Therefore, currently available prior software development information lacks situational context that may be used to dynamically generate context-specific information based on a user's situational factors.

Embodiments of the invention provide a method, article, and system that provide a situation-based software information tool that maps user roles to a consistent set of tags. The tags are built up from a combination of personal user tags, and tags from various communities of practice that the user in that role would belong to. Embodiments of the invention continuously filter the initially formed tag set as the user context changes to form new context sensitive tag subsets. Context changes include tooling used, place and type of software development method, industry vertical that the user is operating in, etc. Embodiments of the invention use the context sensitive tag subset to dynamically query and aggregate content from disparate informational and asset sources.

Based on a role, embodiments of the invention utilize a table that maps that role to the relevant communities of practice. In embodiments of the invention, a user may have many roles such as a personal role or a Community of practice (CoP) role. For example, a user may want to be in a personal role where the user wants to manage their tags around the entire Web 2.0 application that they are involved with. A user in the CoP role, such as a CoP of all IBM developers, may want to manage or use a domain-specific tag for their CoP. Each one of these communities of practice would have a set of consistent tags associated with that community. For a particular role, a starting set of consistent tags is assembled from the relevant communities. This starting set of consistent tags represents an initial taxonomy for that role.

Figure 1A:
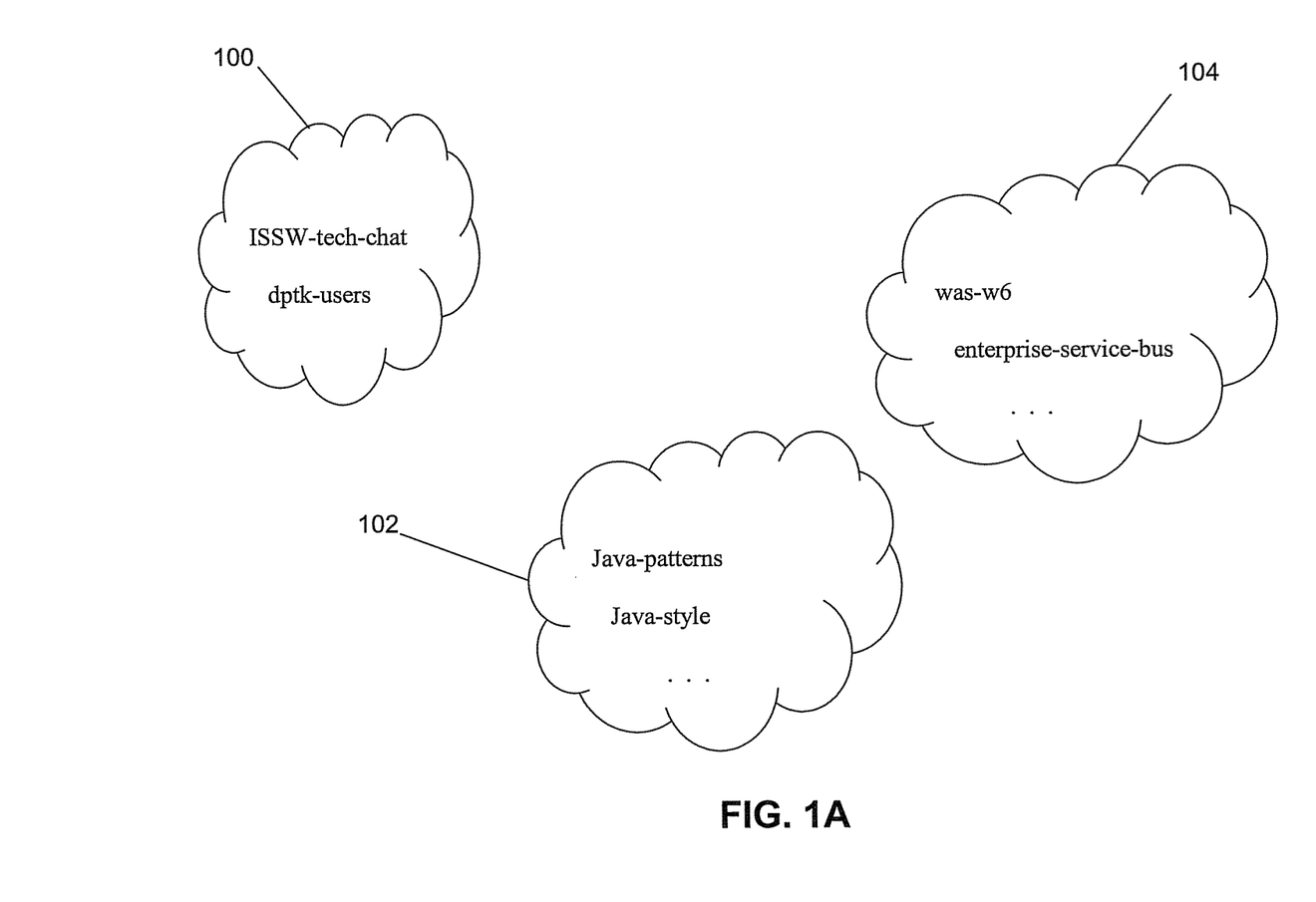
FIG. 1A illustrates a series of communities of practice (CoP) with associated role based tag clouds according to embodiments of the invention.

FIG. 1A illustrates a series of communities of practice (CoP) with associated role based tag clouds according to embodiments of the invention. For example, an IBM Software Services for WebSphere® (ISSW) developer may be mapped to the following CoP (tag clouds): ISSW CoP (100); IBM Developer CoP (102); Websphere® CoP (104); SOA Developer CoP (not shown); etc.

ISSW members are a team of highly skilled consultants with broad architectural knowledge, deep technical skills, best practices expertise, and close ties with IBM research and development labs. Services offered by ISSW consultants and developers include skills transfer, implementation, migration, architecture and design services, as well as customized workshops and education to fit various customer business needs. WebSphere® refers to an IBM brand name that encompasses tools for developing e-business applications and middleware for running web applications. IBM Software Services for WebSphere® makes it easy for clients and partners to design, build, test, and deploy solutions, helping them to become an on demand business.

Continuing with FIG. 1A, each one of these CoPs (100, 102, 104) have their own set of consistent unique tags, which are aggregated together to give an initial set of tags for that role. In an exemplary embodiment, the ISSW developer in the ISSW CoP (100) is involved in a series of technical discussions (tech chats) that are recorded and tagged as issw-tech-chat, and users employing the transformation technology called design pattern toolkit (DPTK), which provides a template engine for generating applications based on customizable, "model to text" transformations, are tagged as dptk-users. In the exemplary Websphere® CoP (104), users that are utilizing Websphere® application server (version 6), and all related information sources about this product are tagged 'was-v6.' In addition, a core component of SOA architectures is the enterprise service bus, and all related information sources referring to the enterprise service bus are tagged 'enterprise-service-bus.' In the exemplary IBM Developer CoP (102) the Java program script is utilized. Consistent Java architectures are built up with Java best practices that are referred to as Java patterns, and all related information sources about the Java patterns are tagged with a 'java-pattern' tag. Best practices for how to write a program utilizing Java is provided by guidance called Java style, and all related information sources about Java style are tagged with a 'java-style' tag.

Figure 1B:
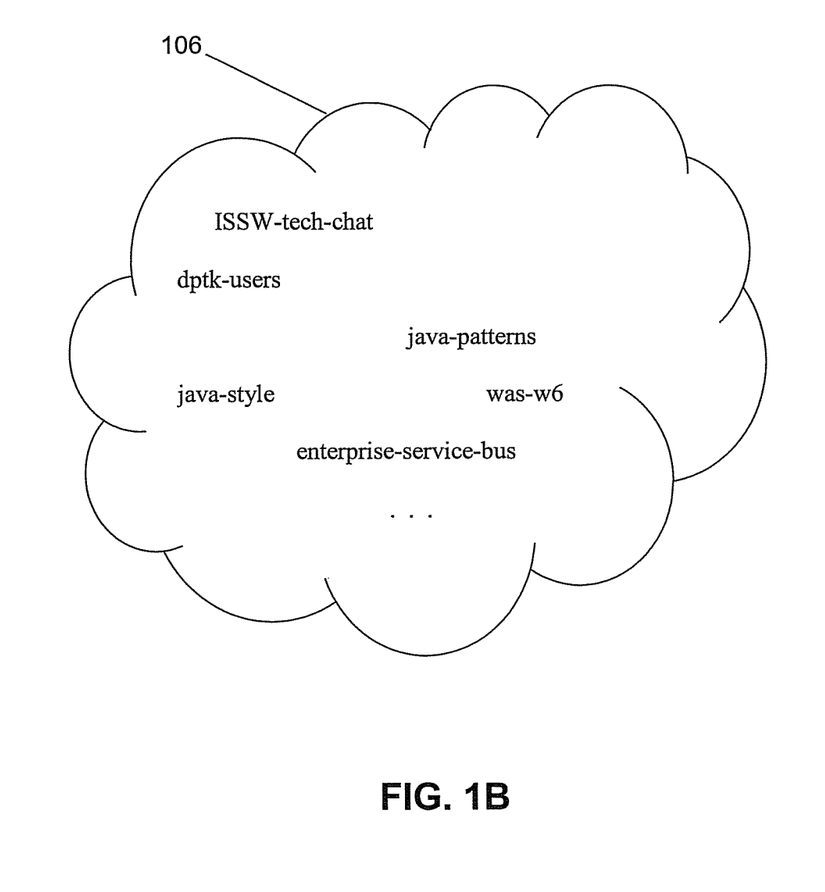
FIG. 1B illustrates an initial set of role-based tags based on the CoP of FIG. 1A according to embodiments of the invention.

FIG. 1B illustrates an initial set (106) of role-based tags based on the CoP of FIG. 1A according to embodiments of the invention. The initial set (106) of role-based tags for the ISSW developer role is formed from the aggregation of tags within the respective CoP of FIG. 1A. For example:

Initial set of tags for ISSW developer role=ISSW CoP Tags+IBM Developer CoP Tag+Websphere CoP+ SOA Developer CoP+ . . . + or more generally,

Initial set of role based tags=Sum of all(CoP Tags)

Figure 1C:
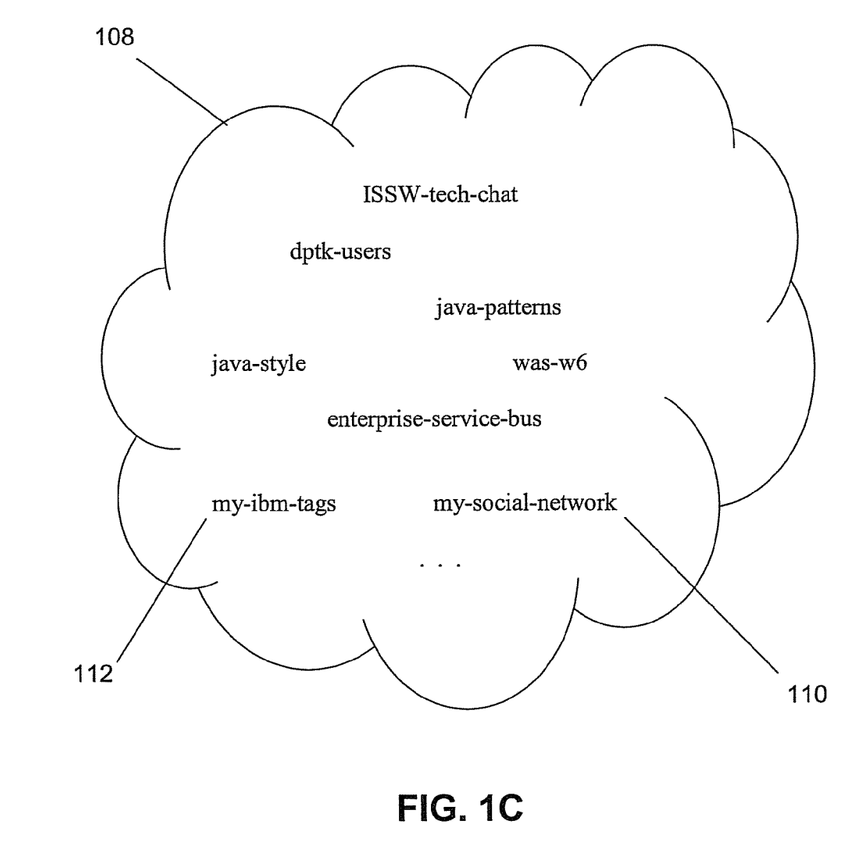
FIG. 1C illustrates an initial set of user in role-based tags based on the CoP of FIG. 1A, and personal tags according to embodiments of the invention.

FIG. 1C illustrates an initial set (108) of user in role-based tags based on the CoP of FIG. 1A, and personal tags (110, 112) according to embodiments of the invention. The personal tags (110, 112) (user set of consistency tags) make the role set (108) relevant to a particular user. Therefore, the initial set of user in role based tags is equivalent to:

Initial set of user in role based tags=Sum of all(CoP) Tags+Personal Tags.

The resultant taxonomy of FIG. 1C is context independent, and following the development of the initial set of tags, the initial set of tags is filtered. As the user in this role becomes context aware, the taxonomy is filtered based on the context. Context elements for filtering the initial set of tags include: the skill level the user has in the role; the preferred language of the user in the role; the industry vertical the user in the role is in; the method the user in the role is using; where the user in the role is in the method; what tool (including version) the user in the role is using; what file type the user in the role is using; what file type the user in the role is using with the tool; custom context (usually supplied by a team leader); and the location of the user in that role.

Following the filtering of the initial set of tags, the resultant subset of tags, referred to as context sensitive user-role tags, are then used to query backend informational services to dynamically provide content to the user based on the user context. Information services that are assessed include: bookmark services, media services, asset services, people services, educational services, and social software services (e.g., blogs and wiki). Embodiments of the invention dynamically aggregate the information from these disparate sources to construct software development information.

A further example application of embodiments of the invention may be a patent agent (taking the place of a software developer as the user role in question) involved in composing patent applications. In this example, the patent agent may belong to a number of CoP such as a patent agents CoP, a lawyers CoP, the firm the agent works for CoP, etc. The patent agent may also have created their own set of personal tags from bookmarks, podcasts, YouTube movies, online libraries, etc. Combining and filtering these tags a user in role sub set of tags for the patent agent is obtained. As the patent agent creates the patent application, the patent agent is in certain contexts, such as a claims drafting context. In each context, the agent will require access to tools and boilerplates. Using the dynamic tag creation described in embodiments of the invention, the creation of a set of context aware user in role set of tags may be created, to accurately reflect the agent (user in role) in this context (drafting claims), to the information that the agent may need such as the relevant document on patenting guidelines from the patent filing office, the correct document boiler plate to use, relevant book marks, and other related assets.

Figure 2:
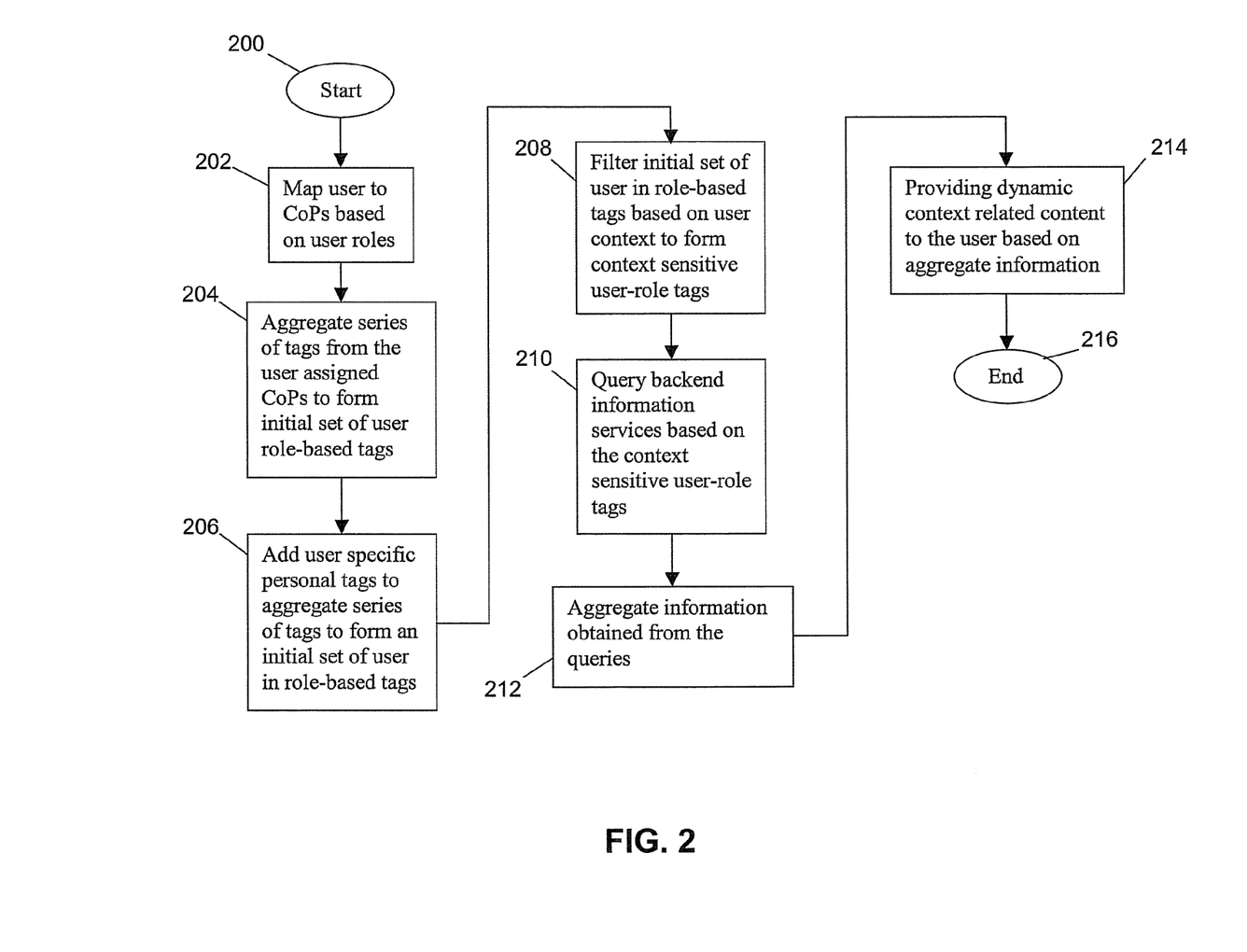
FIG. 2 is a flowchart for implementing a method for providing a situation based software information tool that maps user roles to a consistent set of tags according to embodiments of the invention.

FIG. 2 is a flowchart for implementing a method for providing a situation based software information tool that maps user roles to a consistent set of tags according to embodiments of the invention. The process starts (block 200) by mapping a user to one or more CoP based on user roles (block 202). In response to the mapping of the user to the one or more CoP, an aggregation of tags contained in the one or more CoP is made (block 204) to form an initial set of user role-based tags. User specific personal tags are then added to the initial set of user role-based tags to form an initial set of user in role-based tags (block 206). Subsequently, the initial set of user role-based tags is filtered based on user context to form context sensitive user-role tags (block 208). The context sensitive user-role tags are then utilized to query information services (block 210), and the information obtained from the queries is aggregated (block 212). The aggregated information is provided to the user as dynamic context related content to the user (block 214), and the process ends (block 216)

Exemplary embodiments of the invention may be implemented to provide a mechanism for maintaining separate, distinct sets of application-specific and group domain-specific tags for a user in an SOA environment or model that is designed to provide user access to integrated tag-based services and process, such as Web 2.0 applications that include features for collaborative tagging of web content. In exemplary embodiments, the mechanism may be configured to maintain a distinct tag set for each of a number of separate identities or roles that the user may desire to take on in the SOA environment.

Figure 3:
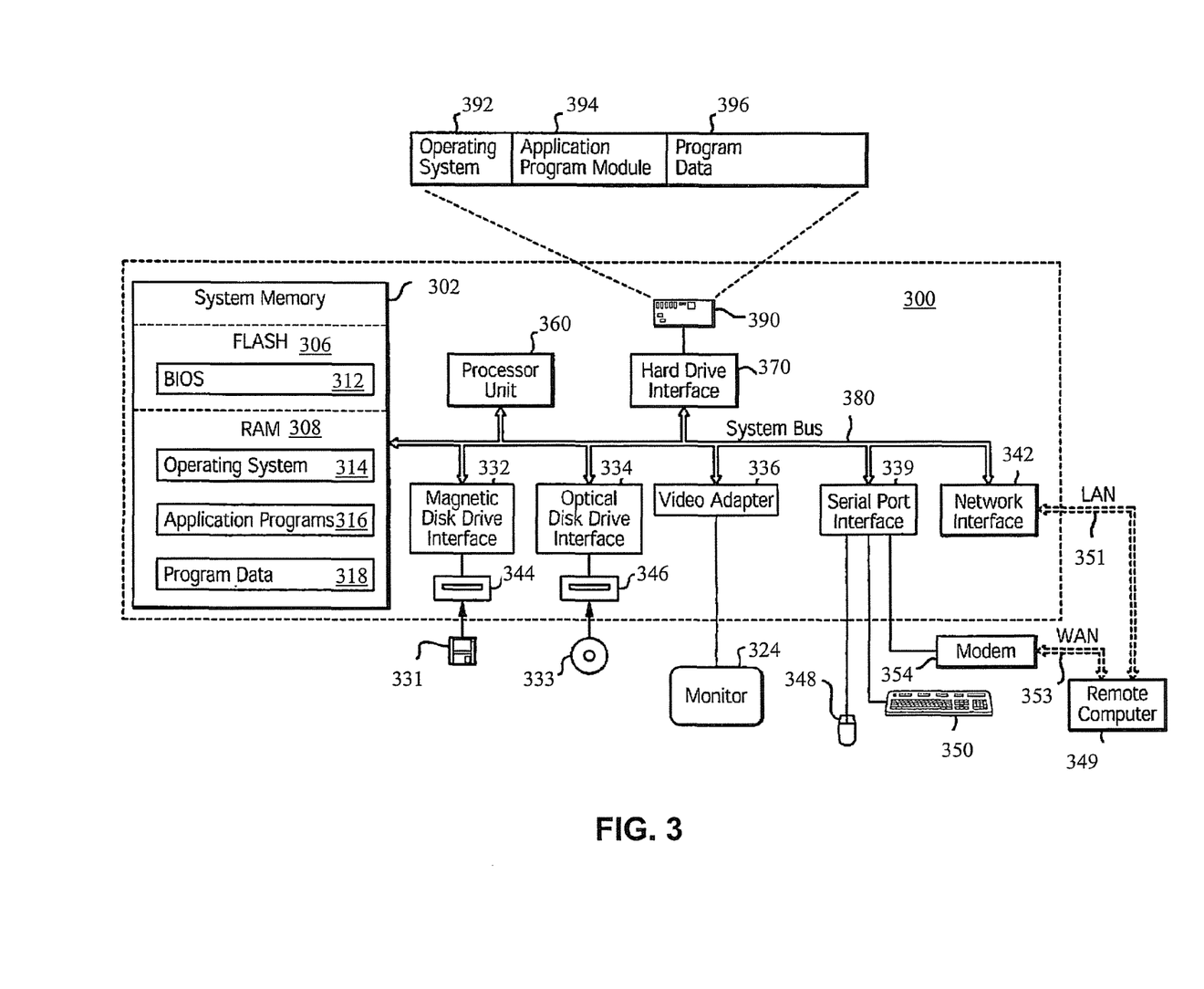
FIG. 3 is a block diagram illustrating an exemplary computer system that may be utilized to implement exemplary embodiments of the invention.

FIG. 3 and the following discussion are intended to provide a general description of an exemplary data processing system that can be adapted to implement exemplary embodiments of the invention. While exemplary embodiments of the invention will be described in the general context of an application program that runs on an operating system in conjunction with a personal computer, those skilled in the art will recognize that exemplary embodiments may also be implemented in combination with other program modules such as, for example, platform software modules, user-written software modules (such as spreadsheet templates, word processor macros, graphics scripts, etc.), routines, programs, components, data structures, etc. that perform particular tasks or implement particular abstract data types. Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like, as well as in distributed computing environments where tasks are performed by remote processing devices that are linked through a communications network. In a distributed computing environment, program modules may be located in both local and remote memory storage devices.

Referring now to FIG. 3, there is depicted an exemplary data processing system 300 that may be utilized to implement exemplary embodiments of the present invention. For discussion purposes, the data processing system is described as having features common to a personal computer, such as a desktop or portable computer. As used herein, however, the terms "data processing system," "computer," and the like are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, web-enabled televisions, home automation systems, multimedia viewing systems, gaming consoles, etc.).

Data processing system 300, as provided in FIG. 3, is configured as a personal computer that generally includes a processing unit 360, a system memory 302, and a system bus 380 that couples system memory 302 to processing unit 360. The system memory 302 includes flash memory 306 and random access memory (RAM) 308. Flash memory 306 is an electrically erasable programmable read only memory (EEPROM) module that includes a basic input/output system (BIOS) 312. BIOS 312 contains the basic routines that facilitate transfer of information between elements within personal computer 300, such as during start-up.

Data processing system 300 further includes a hard disk drive 390, a magnetic disk drive 344 (which can be used to read from or write to a removable disk 331), and an optical disk drive 346 (which can be used to read a CD-ROM disk 333 or read or write to other optical media). Hard disk drive 390, magnetic disk drive 344, and optical disk drive 336 are electrically communicatively coupled to system bus 380 by a hard disk drive interface 370, a magnetic disk drive interface 332, and an optical drive interface 334, respectively. The drives and their associated computer-readable media provide nonvolatile storage for data processing system 300. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments.

A number of program modules may be stored in the drives and RAM 308, including an operating system 314, application program modules 316 (such as, for example, word processors, design applications, and IBM's Workplace Forms suite of program modules), and program data 318. A user may enter commands and information into data processing system 300 through a keyboard 350 and a mouse 348. Other input devices (not shown) may include, for example, a microphone, joystick, game pad, satellite dish, scanner, or the like. These and other input devices are often connected to processing unit 360 through a serial port interface 339 that is coupled to system bus 380, but may be connected by other interfaces, such as a game port or a universal serial bus (USB). A monitor 324 or other type of display device is also connected to system bus 380 via an interface, such as a video adapter 336. In addition to the monitor, the exemplary computer operating environment may also include other peripheral output devices (not shown), such as speakers or printers.

Data processing system 300 may operate in a networked environment using logical connections to one or more remote computers, such as a remote computer 349. Remote computer 349 may be, for example, a server, a router, a peer device, or another common network node, and may include many or all of the elements described in relation to data processing system 300. The logical connections depicted in FIG. 3 include a local area network (LAN) 351 and a wide area network (WAN) 353.

When used in a LAN networking environment, data processing system 300 is connected to LAN 351 through a network interface 342. When used in a WAN networking environment, data processing system 300 includes a modem 354 or other means for establishing communications over WAN 353, such as the Internet. Modem 354, which may be internal or external to data processing system 300, is connected to system bus 380 via serial port interface 339. In a networked environment, program modules depicted relative to data processing system 300, or portions thereof, may be stored in the remote memory storage device. It will be appreciated that the network connections shown are exemplary and other means of establishing a communications link between the computers may be used.

Exemplary embodiments of the present invention may be implemented in conjunction with an SOA environment such as, for example, an integrated web services implementation, in which the SOA supports integration and consolidation of any number of services and processes. Web services are self-contained, self-describing, modular applications that may be described, located, and invoked over a computer network such as the World Wide Web. Web services utilize standardized interfaces and protocols (for example, a web Application Programming Interface (API)) to implement consolidation and integration methods that allow different entities or web-based applications to communicate data, logic, and processes with one another over a network. These standardized methods permit different applications to exchange resources with other entities or applications that are running on different operating systems. In an SOA environment, the SOA may define a interface through which a service-requesting or client-side party may access web services or enterprise-based services provided within an enterprise domain, specify or consolidate a set of web services or web service providers that may be invoked through the interface, and define protocols for communicating with the set of web services through the SOA interface.

Figure 4:
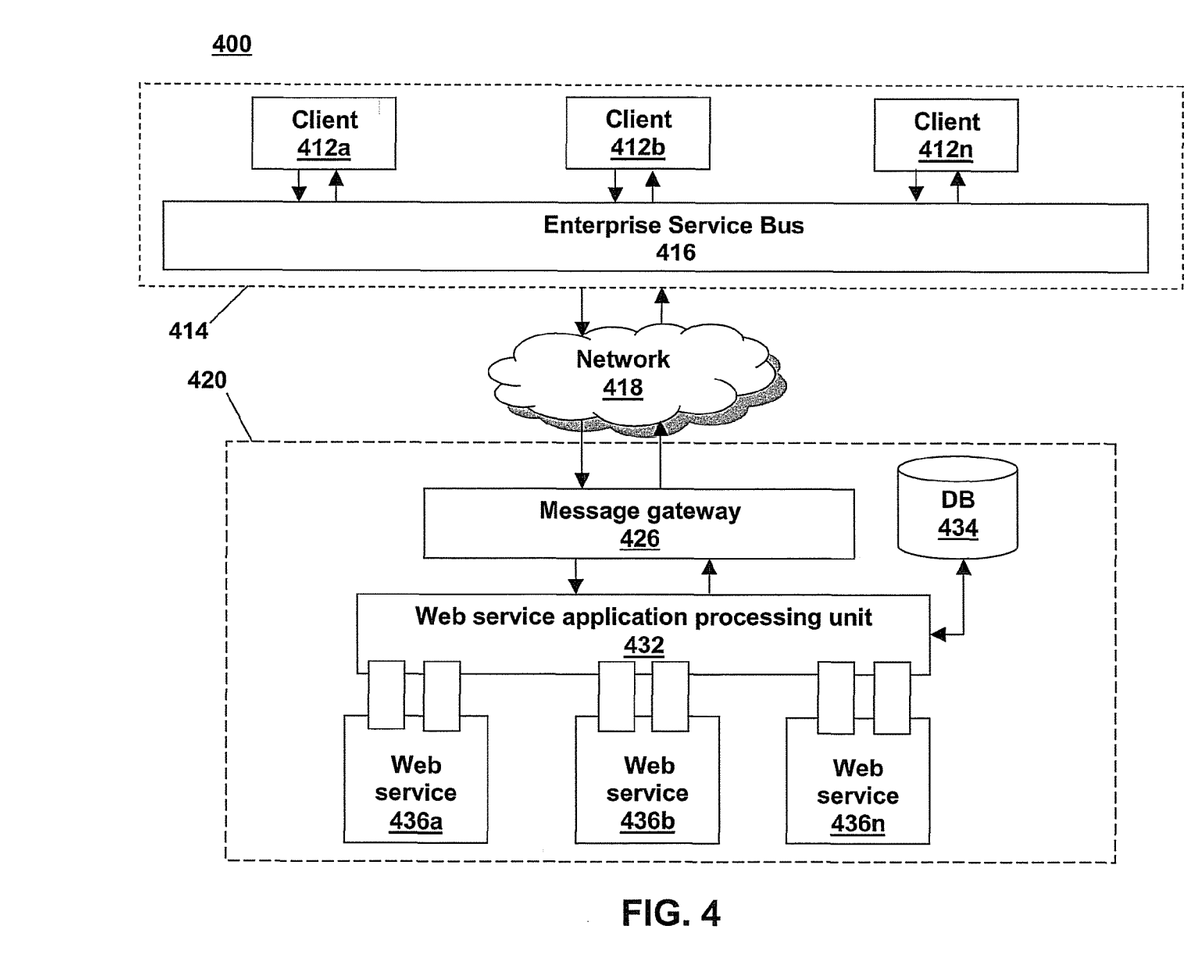
FIG. 4 is a block diagram illustrating an operational configuration of an exemplary embodiment of an SOA web service system according to embodiments of the invention.

FIG. 4 is a block diagram illustrating an exemplary embodiment of an SOA web service system 400 within which exemplary embodiments of the invention may be implemented and operated in a collaborative environment such as that of a business enterprise. Web service system 400 allows for the exchange or transport of web service data or web service messages between multiple client applications (412a, 412b-412n) within an enterprise domain 414 to any of multiple web services (436a, 436b-436n) hosted by a web service application server or provider 420 using an enterprise service bus (ESB) 416. In exemplary embodiments, web service system 400 may allow for the exchange or transport of web service data or web service messages between client applications 412 and a number of web service application providers that each host one or more web services over a communications network 418.

Client applications 412 are software applications that include one or more sequences of instructions that are executable by one or more processors. For example, applications 412 may be programs that are executable on a computer system such as the data processing system illustrated in FIG. 3, described above. Web services 436 may include some combination of programming and data that are made available through application server 420 for end users and other network-connected application programs. In exemplary embodiments, web services 436 may comprise one or more web applications that are implemented to allow users of client applications 412 to communicate therewith to create and store folksonomic tags for describing web content such as, for example, digital images or internet bookmarks.

When a client application needs to invoke a remote web service at application server 420, the invoking client application generates a request message describing arguments to be given to the web services, and requests processing by the web services. Upon receiving the request message, application server 420 performs the processing for the requested web services, and returns a response message describing any return values of the processing to the client application.

ESB 416, which is a component of enterprise domain 414 in the present exemplary embodiment, serves to provide an enhanced messaging middleware infrastructure for the enterprise domain and provides the set of capabilities through which the SOA may be implemented. The capabilities provided by ESB 416 may include, for example, invocation, routing, mediation, messaging, mediation, messaging, process choreography, service orchestration, complex event processing, and management functions. In general, ESB 416 serves as a centralized broker that handles issues relating to security, access, and communication in the SOA environment. In exemplary embodiments, ESB 416 may be configured to perform data integration to ensure that information is kept consistent within the SOA environment, provide a common user interface through which client applications 412 may access the web services that are specified by the SOA, and to extract policies or rules from the specified web services so that if one service is replaced with a different vendor's services in the SOA specification, the business rules do not have to be re-implemented. In alternative exemplary embodiments, ESB 416 may be a vendor-provided service bus that is external to enterprise domain 414.

In one particular exemplary capability, ESB 416 serves as a message mediator by receiving, processing, and passing request messages from client applications 412 and response messages from web services 436 such that the services can be called to perform their tasks in a standard way, without the services having foreknowledge of the calling client applications, and without the client applications having or needing knowledge of how the services actually perform their tasks. In exemplary embodiments, the message processing performed by ESB 416 may be built upon generally accepted web services standards and protocols such as, for example, XML (a markup language for describing data in message payloads in a document format), HTTP (or HTTPS, a request/response protocol between clients and servers used to transfer or convey information), SOAP (a protocol for exchanging XML-based messages over a computer network, normally using HTTP), and XACML (a markup language for expressing access control rules and policies).

ESB 416 and web services 436 communicate with each other, as well as with other applications and web service systems, through network 418. Network 418 is configured to receive and pass on request and response messages accordingly, and to use the transportation protocol or protocols used by messages. Network 418 includes intranets, extranets, and the Internet, and may contain any number of network infrastructure elements including routers, switches, gateways, etc. For example, network 418 may be the public Internet or a private LAN. In exemplary embodiments, ESB 416 may also communicate with other web service providers to provide other web services and applications through network 418 to client applications 412, as well as with enterprise service providers through an intranet within enterprise domain 414 that provide other services and processes such as enterprise legacy services to the client application.

Application server 420 provides web services 436 to client applications 412 through network 418. A web server application processing unit 432 (such as WebSphere®, a product of International Business Machines Corporation) oversees the execution of multiple web services 436a, 436b-436n that reside on application server 420. Network 418 passes each request message to and receives each response message from application processing unit 432 through a message gateway 426 such as, for example, a proxy, firewall, or other message intermediary. Message gateway 426 receives request messages from network 418 and passes response messages to the network. Message gateway 426 performs lexical analysis of request messages to create input objects including parameters for invocation of one or more of web services 436. Message gateway 426 sends input objects to web service application processing unit 432, which calls the appropriate web services that correspond to the method invocation of the input objects, executes the appropriate logic, and returns the result as output objects that include the return values of the invoked web service(s), to the message gateway. Message gateway 426 converts output objects into response messages, and transmits the response messages through network 418 to the invoking client applications.

Application processing unit 432 may also be supported by a database management system 434, which may be any conventional data repository for storing, managing, and retrieving data. In exemplary embodiments, database 434 may be a relational or object-relational database management system, such as DB2, a product of International Business Machines Corporation. In exemplary embodiments, database 434 may be internal to application server 420 (as shown in FIG. 4) or, alternatively, reside externally on a separate machine. In exemplary embodiments, application server 420 may use a single database 434 to serve multiple web services 436 (as shown in FIG. 4) or, alternatively, use a separate database for each separate web service.

Figure 5:
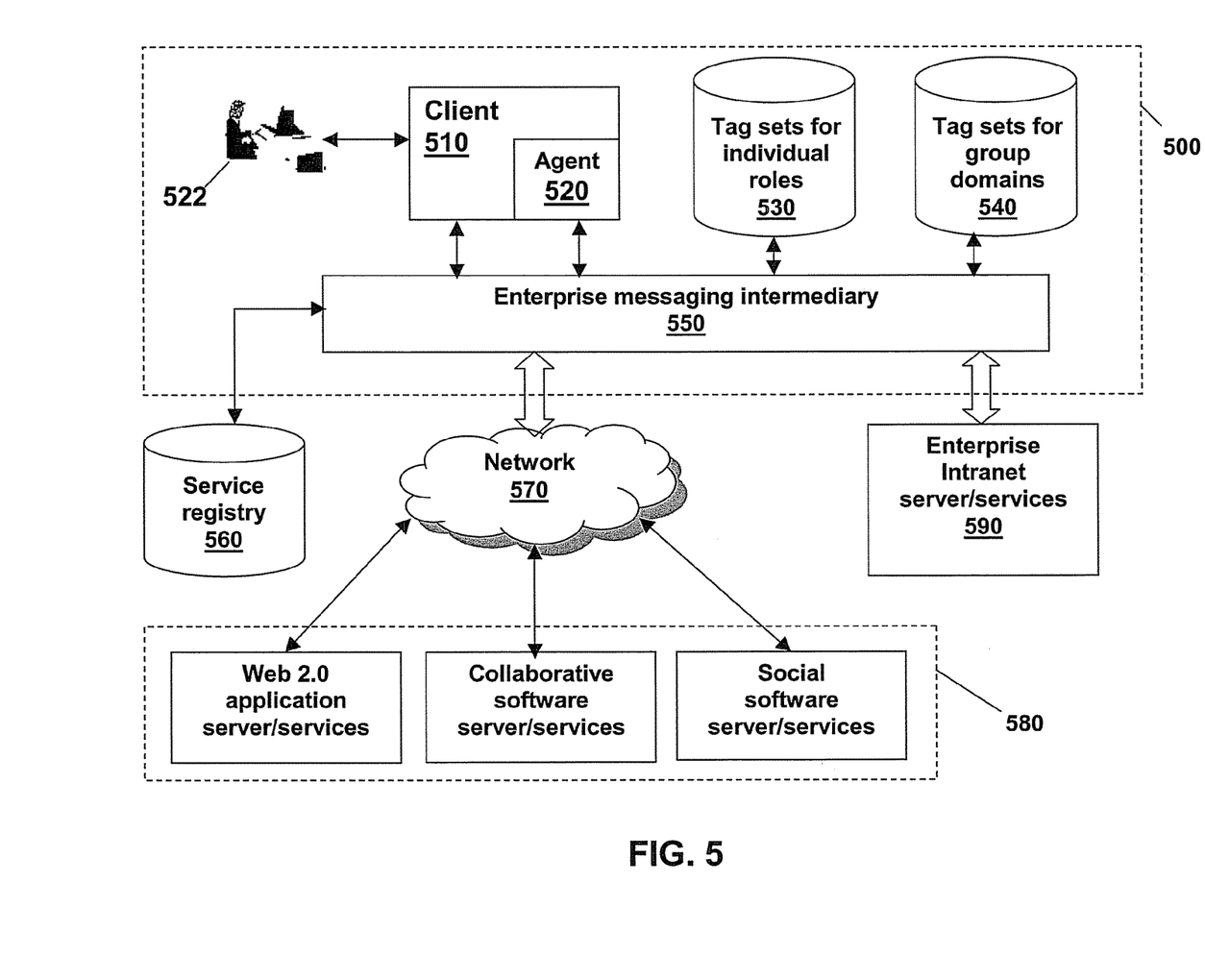
FIG. 5 is a block diagram illustrating an exemplary embodiment of a tag management system in accordance with embodiments of the invention implemented within an exemplary SOA.

Referring now to FIG. 5, a block diagram of an exemplary embodiment of a tag set manager system 500 in accordance with embodiments of invention is illustrated. Tag set manager 500 may be implemented, for instance, within enterprise domain 414 of the SOA system of FIG. 4, to provide a mechanism for managing and maintaining separate, distinct sets of domain-specific tags for a client-side user 522 in an SOA environment that implements a methodology for providing client applications with access to a specified set of integrated tag-based services and processes that include features for collaborative tagging of web content. In the present exemplary embodiment, the user is operating a local computer running a portal client application 510 that provides a user interface implemented in accordance with the SOA, and through which the user may access the applications that are specified by the SOA. In exemplary embodiments, the SOA specification may include Web 2.0 and other collaborative or social software applications such as, for example, del.icio.us, Flickr, Technorati, Last.fm, and Wrike. In the exemplary SOA of FIG. 5, the specification is shown as including Web 2.0 applications, collaborative software applications, and social software applications as provided by a number of web service providers 580 through a communications network 570, as well as including applications provided by a local Intranet service provider 590.

As shown in FIG. 5, managing system 500 includes a user or client-side agent or proxy 520 (for example, Firefox or Internet Explorer), a personal database management system 530, a group domain data management system 540, and a messaging intermediary 550. Databases 530, 540 may be any suitable type of data repository for storing, managing, and retrieving data that comprises sets of personal and domain-specific tags and other metadata associated with tag-based applications.

In exemplary embodiments, databases 530, 540 may be a relational or object-relational database management systems, such as DB2. In exemplary embodiments, the databases may be internal to local computer running a client application 510 or, alternatively, reside externally on a separate machine within the enterprise domain. In exemplary embodiments, client application 510 may employ a single personal database 530 to store tag sets for one or more roles and a jointly usable, domain-specific group database 540 to store tag sets for each group domain of which the user is a member (as shown in FIG. 5) or, alternatively, employ separate databases to store tag sets for each separate role and/or a separate user-specific group database to store tag sets for each group domain of which the user is a member.

In exemplary embodiments, each database may be configured to store a distinct tag set for one of a number of separate identities or roles that the user may desire to take on in the SOA environment. In this manner, the sets of tags could be maintained independently of any of the tag-based application provided for in the SOA. For example, the user may wish to have a tag set for a personal role that is maintained separately from a tag set for a separate role as a member of a group domain such as Community of Practice (CoP), which refers to a group that is composed of members who share a meaningful relationship and work together to expound their collective knowledge on a topic through collaboration to share ideas, find solutions, and build innovations. In this example, the CoP, to focus knowledge management in community, may wish to provide a pre-defined set of domain-specific tags for its members to employ when using tag-based collaborative or social software. The user, in a role as a member of a CoP, may thus desire to synchronize some of their tag sets with a specified set of domain-specific tags for the CoP for each of the tag-based application with which they are involved, while the user may wish to personally manage a separate set of tags for each or all of the tag-based services with which the user interacts in a personal role outside of the CoP. In exemplary embodiments, agent 520, which may access the tag set databases over message intermediary 550, may provide this functionality.

In exemplary embodiments, the user's tag sets may be stored as directory entries according to the Lightweight Directory Access Protocol (LDAP), and the databases could be implemented as an LDAP directory. LDAP is an application protocol for querying and modifying directory services running over TCP/IP. LDAP directories comprise a set of objects with similar attributes organized in a logical and hierarchical manner as a tree of directory entries. Each directory entry has a unique identifier (identifying, for example, for one of the user's roles) and consists of a set of attributes (for example, the tag-based applications in the SOA and the tag sets for each of applications, along with additional metadata). The attributes each have a name and one or more values, and are defined in a schema.

In exemplary embodiments, agent 520 may be configured to, in response to commands from the user, initiate an LDAP session by connecting to one of the databases, send operation requests to the database, and receive responses sent from the database in return. Agent 520 may be configured to search for and retrieve tag entries associated with specific user roles and tag-based applications, compare tag terms and other attribute values, add, delete, modify the user's roles, tag sets, and tag and tag-based application attributes, import tags and tag sets from existing databases and directories, etc. By binding tag set attributes for each particular user role with a particular entry in an LDAP directory (or within an alternative data model or directory type), agent 520 may associate each particular role with content submitted or posted in that specific role so that it may be used consistently whenever tags are posted by the user or whenever tags that have already been posted by the user are detected.

In the present exemplary embodiment, agent 520 is a self-contained, interactive object configured to execute concurrently with client application 510 to act on behalf of the user running client application 520. In exemplary embodiments, agent 520 can be configured to provide a user interface through which the user can interact with the agent to instruct it to perform desired functionality. For example, agent 520 can be implemented as a web browser that enables the user to display and interact with text, images, and other information at each of the tag-based applications provided for in the SOA. In another example, client application 510 may comprise a web browser, and agent 520 may be implemented as a browser applet such as an Adobe Flash or Java application to provide part of or the entire user interface. In exemplary embodiments, agent 520 may be implemented according to the WS-CAF web service standard to provide composite functionality of each of the tag-based applications specified in the SOA through the user interface.

In the present exemplary embodiment, when client application 510 or agent 520 needs to invoke a remote application server, the invoking application generates a request message describing arguments to be given to an application specified in the SOA, and requests processing by the application. Messaging intermediary 550, which comprises a communications middleware component supporting a variety of communications paradigms, APIs, platforms, and standard protocols, receives the request message from the invoking application, processes the message in accordance with specified business rules and provisions, determines the location of the requested service provider (for example, by accessing service registry 560), and sends the message to the appropriate service provider. In exemplary embodiments, messaging intermediary 550 may be configured based upon standards such as XML, SOAP, UDDI, and WSDL. Upon receiving the request message, application server 520 performs the processing for the requested web services, and returns a response message describing any return values of the processing to message intermediary 550, which in turn returns the response message to the invoking application.

Messaging intermediary 550, which may be a component of an enterprise service bus such as ESB 416 of FIG. 4, is configured to transform message formats between clients and service providers, route requests to the correct service providers, and convert transport protocols between clients and providers. For example, if a service provider expects encrypted messages, message intermediary 550 may include such a capability in request messages sent to that provider. Messaging intermediary 550 may be configured to provide virtualization of the applications according to rule and specifications of the SOA to client application 510 and agent 520, allowing the logic of those applications to be developed and managed independently of the infrastructure, network, and other provisions of the services specified in the SOA. In this manner, messaging intermediary 550 may help promote loose coupling between client application 510 and the service providers.

In the present exemplary embodiment, message intermediary 550 and service providers 580 communicate with each other through network 570. Network 570 is configured to receive and pass on request and response messages accordingly, and to use the transportation protocol or protocols used by messages. Network 570 includes intranets, extranets, and the Internet, and may contain any number of network infrastructure elements including routers, switches, gateways, etc. For example, network 570 may be the public Internet or a private LAN. In the present exemplary embodiment, message intermediary also communicates with Intranet service provider 590 according to transportation protocols specified for the local domain. In exemplary embodiments, as specified by the SOA, message intermediary 550 may also communicate with other web service providers to provide other web services and applications through network 580 to client application 510, as well as with other local domain service providers that provide other services and processes such as enterprise legacy services to the client application.

In the present exemplary embodiments, agent 520 is configured to act on instructions provided by the user to access a database through message intermediary 550 to load a set of tags that corresponds to a tag-based application specified by the user and a role specified by the user, display the first set of tags to the user, and to communicate with the service specified by the user to post tags selected by the user from the displayed set of tags to content at the service. In exemplary embodiments, agent 520 may provide a seamless user experience by not requiring multiple logins. At the time the user logs in to agent 520, the user can specify a role (for example, the user can connect to the agent in a personal role, or as a member of a group domain such as a CoP). Agent 520 is configured to be aware of each of the tag-based applications that client application 510 may access through the SOA, as well as each specified role that the user may desire to use when logging in to the agent. In exemplary embodiments, agent 520 can be configured to supply any necessary login information to connect to each of the tag-based applications specified by the SOA on behalf of the user, in each of the specified roles for the user. In exemplary embodiments, when the user logs into the agent, the agent can then either automatically log the user into all of the tag-based applications specified by the SOA or automatically log the user into and out of each of the tag-based applications at separate times as desired by the user.

In the present exemplary embodiment, because agent 520 has access to each set of tags maintained for the user in databases 530, 540 over message intermediary 550, the agent can be configured to allow for dynamic management of the tag sets, such as by adding, deleting, or renaming tags. In exemplary embodiments, the user, or, for a group domain, the domain administrators or knowledge engineers, could be responsible for creating the initial taxonomy or folksonomy for a tag set, as well as any further management of the tag set after it has been created. In exemplary embodiments, agent 520 may be implemented to provide authorization procedures for controlling who may create and manipulate tag sets for various roles. The master tag set for the user's personal (non-group) roles would be maintained in database 530, and the master tag set for each group domain of which the user is a member can be maintained in a single, separate database such as database 540.

In exemplary embodiments, to ensure consistency of the sets of tags maintained for the user across each tag-based application provided for in the SOA, agent 520 may be configured to synchronize the current taxonomy of each separate tag set that is maintained for the user with any prior tags the user had created to describe web content at the tag-based application corresponding to that tag set. That is, once the user is satisfied with the consistency of the set of tags that the user has created or modified for a specific role, the tags could then be updated in a one-way synchronization in all of the tag-based applications provided for in the SOA with which the user was involved or as otherwise desired by the user. This would provide the user with a consistent set of tags for web content across all tag-based applications of the SOA in that role and allow the use or other members of a group domain to, for example, make meaningful web feed queries to aggregate content across these applications.

In exemplary embodiments, agent 520 may perform synchronization operations by mining the tag sets of each of the tag-based applications of which the agent 520 is aware, and then accessing each tag-based application to update each prior tag created by the user in the specified role for objects or web content within that tag-based application with the new tag set now maintained in one of the databases. In exemplary embodiments, agent 520 can perform this by first loading the new tag sets for each of the tag-based applications for the user in the specified role, then comparing the new tag set for each tag-based application with each prior tag created by the user in the specified role at that tag-based application, and finally performing a one-way synchronization of the tags from the tag sets maintained at the client-side to each of the registered applications.

In exemplary embodiments, agent 520 can be also configured to configured to perform other synchronization operations on the user's tag set such as synchronizing separate tag sets maintained for separate user roles but corresponding to the same tag-based application, synchronizing a domain-specific tag set with other tag sets for the user, or with the tag sets of a group domain or CoP. In various exemplary embodiments, agent 520 may be configured to perform the synchronization periodically at regular intervals, when initiated by the user or a domain expert, or whenever the user logs in as a specific role or to one of the tag-based services provided for in the SOA.

In exemplary embodiments, the user may login to agent 520 as and assume more than one specified role during a session. To enable a user to posts tags to tag-based applications using multiple roles concurrently in a single session, agent 520 may perform role-based session management on the client-side by placing additional identifier metadata that specifies the actively-tagging role for the user on the tags as they are published to tag-based applications. The identifier metadata must be unique for each role to prevent occurrences of incidental collision with tags in other roles. Agent 520 may do this, for example, by utilizing role-identifying suffixes or prefixes in a manner similar to that of an XML Namespace. In this way, two identically named tags from different tag sets may be made to be semantically different by specifying metadata that would differentiate the two tags according to role. In situations in which the identical tag term has been posted from the tag sets of distinct roles for the user for the same tag-based application and would otherwise appear ambiguous to agent 520 as to the user role under which it was posted, by adding this specifying metadata to the tags as they are posted, the agent will be able to correctly identify the role under which the user posted a tag by accessing this metadata.

As an example, in a situation where the user logs in as the domain administrator for a CoP, the user has access to domain-specific tags that are particular to that CoP. To ensure that the available tags in this role do not conflict with any other tags in the user's other roles without requiring separate login sessions for the different roles in each tag-based application, agent 520 could add metadata to the tags posted by the user so the tags are suffixed or prefixed with an identifier that is unique to a specific role.

Moreover, in exemplary embodiments, agent 520 may place other metadata that specifies additional information on the tags as they are published to tag-based applications. For example, metadata specifying which tag-based application a particular tag pertains, the type of content that is tagged, the owner of the content that is tagged, tagging categories, etc. may be encoded for each tag. In exemplary embodiments, this could involve appending metadata to a tag (or to a composite tag having role-identifier metadata already appended) with an identifier that is uniquely-specified for the tag-based application to which the tag is posted. In this way, two identically named tags in different tag sets for the user can be made to be semantically different by specifying metadata that would differentiate them according to application.

In exemplary embodiments, the additional metadata encoding or identifiers placed by agent 520 on tags may be presented transparently to the user operating the agent so that the user will be able to identify and manage their tags according to role or other information specified by the metadata. In alternative exemplary embodiments, agent 520 may be configured such that any additional metadata encoding or identifiers are nontransparent when tags are presented to the user. In such embodiments, the tag terminology will appear to the user without the additional information as it did when created, but when agent 520 posts or synchronizes these tags to the tag-based applications specified in the SOA, the agent may prefix or suffix these tags with metadata that specifies additional information.

In exemplary embodiments, agent 520 could also be configured to provide a user interface window or menu such as, for example, a dashboard, to a user or CoP administrator to allow for monitoring and mining of data regarding the use of the tag sets across the various tag-based applications to enable identification of trends and patterns. The user interface could be capable of, for example, performing various queries on tagging operations that have been performed (for example, data on the number of tags left by users, how users use tags, regularities in user activity, tag frequencies, kinds of tags used, etc.). In exemplary embodiments, this information could be used to dynamically create and modify aspects of the dashboard and/or tag sets. For example, the collected information could be used to refine tag set taxonomy, to determine connections between related content, or to "rank" content based upon its perceived utility based upon usage patterns.

In exemplary embodiments, agent 520 could also be configured to provide an applet or a user interface window to a user or group domain administrator that allows for clean-up of any tag set inconsistencies, or other aspects that may lead to unreliable tagging. Such inconsistencies may arise, for example from polysemy (the use of words that have multiple related meanings), synonyms (multiple words with the same or similar meanings), and word inflections (such as with plural forms). In exemplary embodiments, agent 520 may be configured to with a lemmatization engine or to perform word stemming.

In other exemplary embodiments, agent 520 could be configured to maintain a table of synonym tags for a particular tag and to provide the table to the user to allow the user to select a desired tag term to always use for the same or similar meanings. The synonym table could be useful, for instance, the aid in finding appropriate tags for updating, finding particular content in one of the tag-based applications, or creating a new tag in a meaningful manner. The synonym table could be constructed and modified, for example, by the user or domain administrators in a CoP. In exemplary embodiments, the synonym table could be constructed from scratch or, alternatively, agent 520 could be implemented with an initial version that could be updated by the user, domain administrators, or automatically within the agent using a tool that would dynamically construct the synonym table. In exemplary embodiments, the synonym table could be populated at runtime by inspection of tag relationships using pre-defined rules specified by, for example, an enterprise. In exemplary embodiments, agent 220 could be configured to be aware of the role of the user and to permit access to the synonym table based upon the role of the user, such as whether the user is logged-in in a domain administrator role for a CoP synonym table. In exemplary embodiments, the synonym table could be configured to employ a counter to indicate or rank, for a given set of synonyms, which synonym is the best match based upon previous heuristics.

In exemplary embodiments, agent 520 may be utilized by a domain administrator, based upon information collected in data queries, to implement a collabulary for a CoP's tag sets. A collabulary may be defined as a common vocabulary used to categorize content, and in particular, one created in collaboration with classification experts to ensure relevance and consistency. A collabulary may be conceptualized as a compromise between a taxonomy and a folksonomy in which domain administrators collaborate with group members to create rich, but more systematic content tagging systems. The compromise may result is a system that combines the benefits of folksonomies—low entry costs, a rich vocabulary that is broadly shared and comprehensible by the user base, and the capacity to respond quickly to language change—without the errors that inevitably arise in naive, unsupervised folksonomies.

Exemplary embodiments may therefore be implemented as described above to enable a body of information to be increasingly easy to search, discover, and navigate over time using role-based tag sets to label, classify, and retrieve content. Collaborative tagging in this manner may, for example, provide a simple way for users to group bookmarks together and then share these grouped links with colleagues. One employee may retrieve the groups of links saved by another employee through many different routes. A related group may also be delivered to another user at the point of need, that is, when they are looking for related information. Because the tag sets are user-generated and therefore inexpensive to implement, they may provide a low-cost alternative to corporate taxonomies or controlled, hierarchical vocabularies and exemplary embodiments may be used to extend tagging and social bookmarking into the business arena, with the addition of project groups to allow users to collaborate across boundaries. Exemplary embodiments of the present invention may be implemented to provide functionality for tagging of both structured and unstructured content and thereby provide for easier managing of the capture, storage, security, revision control, retrieval, distribution, preservation, and destruction of documents and content. Exemplary embodiments may therefore be implemented to enable an organization, such as a business or governmental agency, to more effectively meet business goals.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for role based situationally aware software, the method comprising:
    mapping a user having one or more roles to one or more communities of practice (COP) based on the user's roles;
    aggregating a series of tags from the one or more CoP based on situational factors;
    dynamically generate context-specific information based on user's situational factor;
    forming an initial set of role-based tags associated with the user based on the aggregated series of tags;
    adding to the initial set of role-based tags a set of personal tags created by the user and the sum of all CoP that the user in that role would belong to, to form an initial set of user in role-based tags;
    filtering the initial set of user in role-based tags as the user context changes to form new context sensitive tag subsets, based on user activity being performed on a computing device by the user at the same time the activity is being performed such that the filtering and the activity occur at the same time to form context sensitive user-role tags;
    following the filtering of the initial set of tags, the resultant subset of tags, referred to as context sensitive user-role tags;
    querying one or more backend information services based on the context sensitive user-role tags;
    aggregating information obtained from querying the one or more information services; and
    providing the aggregated information to the user as dynamic context related content.

2. The method of claim 1, wherein the user context elements comprise at least one of: a skill level the user has in the role; a preferred language of the user in the role; an industry vertical the user in the role is in; a method the user in the role is using; where the user in the role is in the method; what tool, including the tool's version, the user in the role is using; what file type the user in the role is using; what file type the user in the role is using with the tool; custom context as supplied by a team leader; and the location of the user in that role.

3. The method of claim 1, wherein the user services comprise at least one of: bookmark services, media services, asset services, people services, educational services, social software services, blogs, and wilds.

4. The method of claim 1, wherein a service oriented architecture (SOA) is utilized for implementing the method.

5. The method of claim 1, wherein the initial set of role-based tags is context independent.

6. The method of claim 1, wherein the initial set role-based tags are filtered using a set of user defined personal tags to form a set of user in role-based tags; and
    wherein the set of user in role-based tags are further filtered with a set of context elements to form a set of context sensitive user-role tags.

7. An article comprising one or more non-transitory computer-readable storage media containing instructions that when executed by a computer enables a role based situationally aware software application that maps user roles to a consistent set of tags, wherein the method further comprises:
    mapping a user having one or more roles to one or more communities of practice (COP) based on the user's roles;
    aggregating a series of tags from the one or more CoP based on situational factors;
    dynamically generate context-specific information based on user's situational factor;
    forming an initial set of role-based tags associated with the user based on the aggregated series of tags;
    adding to the initial set of role-based tags a set of personal tags created by the user and the sum of all CoP that the user in that role would belong to, to form an initial set of user in role-based tags;
    filtering the initial set of user in role-based tags as the user context changes to form new context sensitive tag subsets, based on user activity being performed on a computing device by the user at the same time the activity is being performed such that the filtering and the activity occur at the same time to form context sensitive user-role tags;
    following the filtering of the initial set of tags, the resultant subset of tags, referred to as context sensitive user-role tags;
    querying one or more backend information services based on the context sensitive user-role tags;
    aggregating information obtained from querying the one or more information services; and providing the aggregated information to the user as dynamic context related content.

8. The article of claim 7, wherein the user context elements comprise at least one of: a skill level the user has in the role; a preferred language of the user in the role; an industry vertical the user in the role is in; a method the user in the role is using; where the user in the role is in the method; what tool, including the tool's version, the user in the role is using; what file type the user in the role is using; what file type the user in the role is using with the tool; custom context as supplied by a team leader; and the location of the user in that role.

9. The article of claim 7, wherein the user services comprise at least one of: bookmark services, media services, asset services, people services, educational services, social software services, blogs, and wikis.

10. The article of claim 8, wherein a service oriented architecture (SOA) is utilized to implement the article.

11. The article of claim 8, wherein the initial set of role-based tags is context independent.

12. The article of claim 8, wherein the initial set role-based tags are filtered using a set of user defined personal tags to form a set of user in role-based tags; and
wherein the set of user in role-based tags are further filtered with a set of context elements to form a set of context sensitive user-role tags.

13. A system for a role based situationally aware software information tool that maps user roles to a consistent set of tags, the system comprising:
a processor;
one or more server devices in communication with one or more client devices through a network, the server devices configured to execute electronic software resident on storage mediums in signal communication with the client and server devices;
wherein the electronic software comprises a series of instructions causing the server devices to:
map a user having one or more roles to one or more communities of practice (COP) based on the user's roles;
aggregate a series of tags from the one or more CoP based on situational factors;
dynamically generate context-specific information based on user's situational factor;
form an initial set of role-based tags associated with the user based on the aggregated series of tags;
add to the initial set of role-based tags a set of personal tags created by the user and the sum of all CoP that the user in that role would belong to, to form an initial set of user in role-based tags;
filter the initial set of user in role-based tags as the user context changes to form new context sensitive tag subsets, based on user activity being performed on a computing device by the user at the same time the activity is being performed such that the filtering and the activity occur at the same time to form context sensitive user-role tags;
following the filtering of the initial set of tags, the resultant subset of tags, referred to as context sensitive user-role tags;
query one or more backend information services based on the context sensitive user-role tags;
aggregate information obtained from querying the one or more information services; and
provide the aggregated information to the user as dynamic context related content.

14. The system of claim 13, wherein the user context elements comprise at least one of: a skill level the user has in the role; a preferred language of the user in the role; an industry vertical the user in the role is in; a method the user in the role is using; where the user in the role is in the method; what tool, including the tool's version, the user in the role is using; what file type the user in the role is using; what file type the user in the role is using with the tool; custom context as supplied by a team leader; and the location of the user in that role.

15. The system of claim 13, wherein the user services comprise at least one of: bookmark services, media services, asset services, people services, educational services, social software services, blogs, and wilds.

16. The system of claim 13, wherein a service oriented architecture (SOA) is utilized within the system.

17. The system of claim 13, wherein the initial set of role-based tags is context independent.

\* \* \* \* \*